United States Patent Office 3,470,913
Patented Oct. 7, 1969

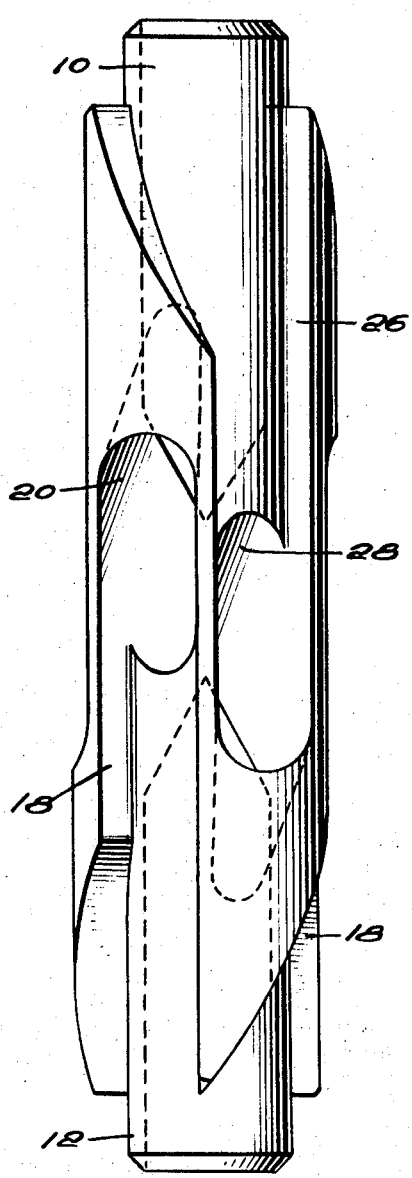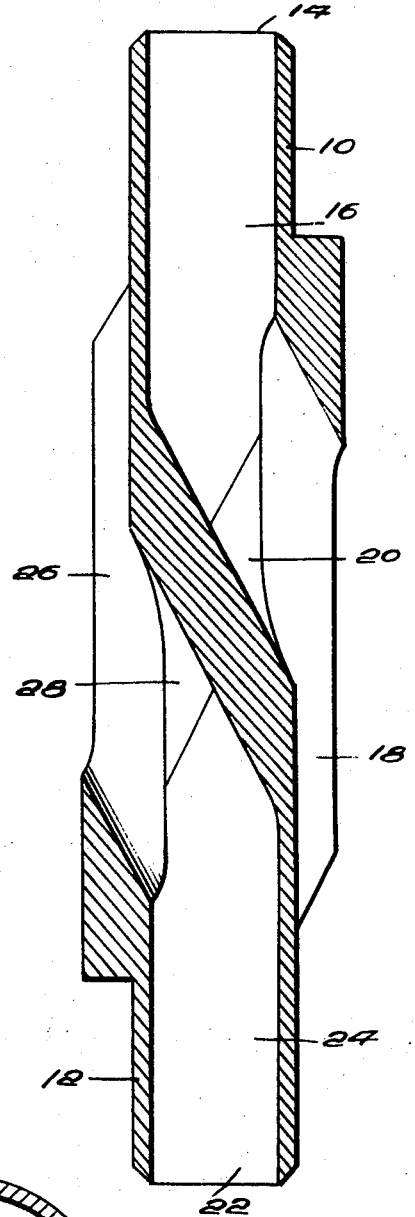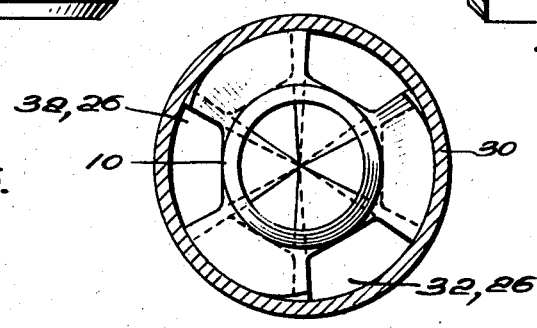

3,470,913
FLOW INVERSION INSERT
Max L. Booy, Sherwood Park, Wilmington, Del., assignor to E. I. du Pont de Nemours and Company, Wilmington, Del., a corporation of Delaware
Filed Jan. 18, 1967, Ser. No. 610,079
Int. Cl. F15d 1/10
U.S. Cl. 138—37                                                    5 Claims

ABSTRACT OF THE DISCLOSURE

A skirt in the form of a tubular extension has been provided at each end of the channeled flow-inverting pipe insert. Skirt lengths are shortened as required to give the desired inversion ratio, according to flow conditions at a given pipe location.

---

This invention relates to the flow of liquids in conduits and, more particularly, to inversion of the flow for the purpose of obtaining a uniform distribution of retention time in the conduit.

Viscous liquids flow through a pipeline with something approaching a parabolic distribution of velocities across the cross section in that liquid close to the wall of the pipe is moving at a relatively low veloctiy in comparison with liquid in the center. In many processing systems, such a velocity distribution is extremely undesirable because of the longer residence time for material flowing near the surface of the pipe. For example, in polymerization processes where molten polymer is transferred from one point to another by means of pipelines, a relatively long residence time for the peripheral material can cause it to polymerize to a much higher molecular weight than faster moving material in the center of the pipe. The resulting polymer consequently has an undesirably wide molecular weight distribution. In the case of some polymers such as polyamides, long residence of the peripheral material in the pipelines also leads to increased formation of gel particles which lower the quality of the fiber or other article formed from the polymer.

Although flow inverters of the insert type are known in the art (U.S. Patent 3,128,794 to Boucher et al.) and have proved successful in equalizing the retention times of viscous liquids in transfer pipes, their designs are such as to require particularized adaptation to flow conditions at a given location. Specifically, a desired ratio of inversion and a more uniform distribution of retention time have been accomplished only by sizing the various flow passages. Due to viscosity variations between inside and outside portions of the liquid stream and other factors, it is difficult to calculate the correct sizes for these passages. Instead, empirical, trial-and-error methods must be employed to insure the desired ratio of inversion at each location.

Such machining requirements have been simplified and the various advantages disclosed herein have been achieved with an elongated cylindrical insert adapted to invert the flow of a viscous material through a pipe. The insert has peripheral and central openings at each end and through channels between peripheral and central openings at opposite ends. According to this invention, at least one end of the insert is provided with a tubular extension of reduced outside diameter for maintaining a divided flow between the peripheral and central openings.

A prefered embodiment is shown in the accompanying drawing wherein FIGURE 1–3 are side, sectional and end views, respectively, of an insert.

Referring to the drawing, the tubular extensions which are the unique feature of the fluid inverter of this invention are shown at 10, 12. Extension 10 defines a central opening 14 and leads to an axial bore 16 which extends inwardly almost halfway through the length of the elongated cylindrical insert. Bore 16 terminates in a tapered configuration which communicates with three longitudinal grooves 18 through axially oriented divergent passages 20. In a similar fashion, extension 12 defines a central opening 22 and leads to an axial bore 24 which communicates with discontinuous surface grooves 26 through axially oriented passages 28. Surface grooves 18, 26 are radially and angularly equispaced.

Except where interrupted by grooves 18, 26, the insert has a cylindrical exterior surface with an outside diameter approximating the inside diameter of pipe 30 (FIG. 3). Extensions 10, 12 have reduced outside diameters. Their radii substantially equal minimum radii of the insert in grooves 18, 26.

When such an insert is placed in a pipe 30, with tubular extension 10 in the upstream position and tubular extension 12 in the downstream position, a central portion of liquid will obviously pass through opening 14 and axial bore 16 while the remaining outer annular portion of the stream passes into peripheral openings 32 defined by grooves 26 (FIG. 3) and through passageways 28 into axial bore 24 to be discharged in the central portion of the conduit through opening 22. Thus, discontinuous surface grooves 26, passages 28, axial bore 24 and extension 12 define through channels while present a minimum of stagnation points between peripheral and central openings 32, 22 located at opposite ends of the insert. Meanwhile, the central portion of the liquid which has passed into opening 14 moves outwardly through passageways 20 into longitudinal grooves 18 and is discharged near the walls of pipe 30. Tubular extension 12 maintains a divided flow between the outputs of grooves 18 and axial bore 24.

For transfer pipes of any given dimension, standardized inserts with tubular extensions of equal length at both ends are fabricated. Depending on conditions at the location where flow is to be inverted, the extensions are tailored to give the desired inversion ratio simply by cutting them to the proper length. Flow conditions could dictate removal of one extension. Usually, upstream and downstream extensions remain but have different lengths. In the latter connection, a relatively longer upstream extension results in a decrease in the amount of viscous material which is inverted to the center of the transfer conduit and an increase in the amount transferred to the outside. Thus, a desired ratio of inversion can be achieved without machining or otherwise altering the sizes or shapes of the grooves, passages or bores.

The illustrated flow inverters may be fitted into pipeline 30 by welding or by shrinking the pipe onto the insert. Alternatively, the cylindrical inserts can be flanged in the manner illustrated by Boucher et al., especially in those situations where the inserts do not have surface grooves. However, the preferred method is to counterbore an end length of the pipe to a slightly larger diameter and fit the insert snugly into the larger bore with its downstream end abutting the smaller bore.

Various adaptations and modifications of the flow inverter disclosed herein will occur to those skilled in the art without departing from the spirit of my invention.

Having thus described the invention, what is claimed as new an desired to be secured by Letters Patent is:

1. An elongated cylindrical insert adapted to invert the flow of a viscous material through a pipe, said insert having peripheral and central openings at each end and through channels between peripheral and central openings at opposite ends, each end of the insert having a tubular extension of reduced outside diameter for maintaining a divided flow between the peripheral and central openings.

2. The insert of claim 1 wherein is provided an axial bore extending inwardly from each extension, each central opening being defined by an extension.

3. The insert of claim 2 wherein the peripheral openings at each end are radially and angularly equispaced and wherein said through channels include longitudinally disposed discontinuous surface grooves, each groove defining a peripheral opening and communicating with an axial bore.

4. The insert of claim 3 wherein each channel includes an axially oriented convergent passage placing a groove in communication with an axial bore.

5. An elongated cylindrical insert adapted to invert the flow of a viscous material through a pipe and provided with through channels between peripheral and central openings at opposite ends, the improvement of which comprises a tubular extension of reduced outside diameter on at least one end of the insert for maintaining a divided flow in the approach to peripheral and central openings at said one end.

References Cited

UNITED STATES PATENTS

| | | | |
|---|---|---|---|
| 3,128,794 | 4/1964 | Boucher et al. | 138—37 |
| 3,128,784 | 4/1964 | Boucher et al. | 138—37 |

PATRICK D. LAWSON, Primary Examiner